C. BANISTER.
APPARATUS FOR SOLIDIFYING COTTON BATTING PREPARATORY FOR PRESSING AND BALING.
APPLICATION FILED MAY 1, 1911.
1,025,503.
Patented May 7, 1912.
2 SHEETS—SHEET 1.
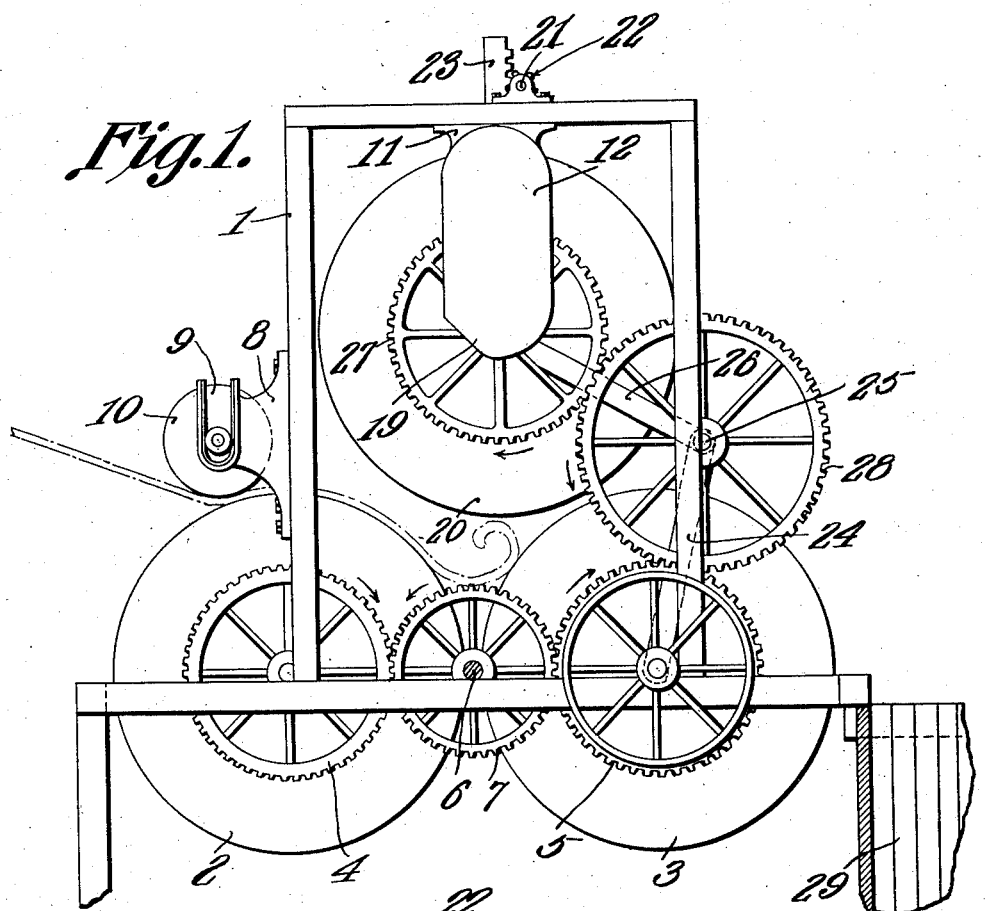
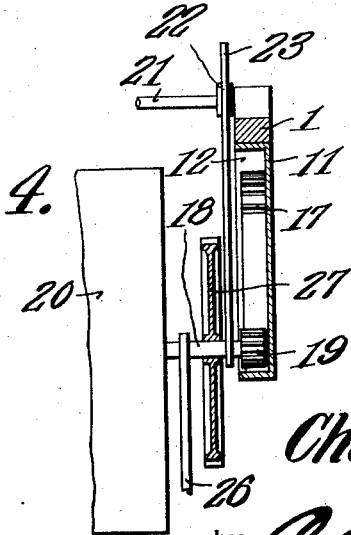
Witnesses
Charles Banister,
Inventor
by
Attorneys C. BANISTER.
APPARATUS FOR SOLIDIFYING COTTON BATTING PREPARATORY FOR PRESSING AND BALING.
APPLICATION FILED MAY 1, 1911.

1,025,503.

Patented May 7, 1912.

Charles Banister,
Inventor

Witnesses by C. A. Snow & Co.
Attorneys

UNITED STATES PATENT OFFICE.

CHARLES BANISTER, OF WACO, TEXAS.

APPARATUS FOR SOLIDIFYING COTTON-BATTING PREPARATORY FOR PRESSING AND BALING.

1,025,503.   Specification of Letters Patent.   Patented May 7, 1912.

Application filed May 1, 1911. Serial No. 624,345.

*To all whom it may concern:*

Be it known that I, CHARLES BANISTER, a citizen of the United States, residing at Waco, in the county of McLennan and State of Texas, have invented a new and useful Apparatus for Solidifying Cotton-Batting Preparatory for Pressing and Baling, of which the following is a specification.

This invention relates to apparatus for solidifying cotton batting preparatory for baling and it consists in the novel construction and arrangement of the parts of the apparatus as hereinafter shown and described.

The object of the invention is to provide a means for taking cotton batting as it comes from the gin condenser and for forming it into rolls of a sufficient density that the baling box will hold enough of the rolls to make the desired weight bale and for automatically assembling these rolls in the baling box preparatory for baling.

In the accompanying drawings,—Figure 1 is a side elevation of the preferred form of apparatus. Fig. 2 is a front elevation of the same. Fig. 3 is a detailed sectional view of a portion of the same. Fig. 4 is a detailed sectional view of a portion of the same cut on the line 4—4 of Fig. 3.

In brief the method of handling the cotton batting to solidify the same in the form of bundles or rolls preparatory to baling consists in taking the batting as it comes from a condenser and subjecting the same to pressure as it is rolled in the form of a bundle whereby the convolutions of the roll throughout the length of the batting constituting the same have been subjected to uniform pressure which enables the batting to roll tight in the bundle resulting in a bundle having uniform density from its center to its periphery. When this bundle arrives at a predetermined size it is ready to be received within the press box of a baling machine. Inasmuch as all of the bundles are subjected to the same method and are removed from the apparatus at a uniform size it will be seen that the bundles as they are delivered to the baling press are of uniform size and density throughout and bales of desired weight are produced. This is an advance over the method of packing and pressing now generally resorted to for the reason that at present the flimsy cotton batting is delivered from a condenser directly into the press box of a baling machine and is operated upon by a packer and when the box is filled the material therein is subjected to pressure. This expensive operation is wholly avoided by the method and machine herein described.

As shown in the accompanying drawings the apparatus for accomplishing the desired result stated consists of a frame 1 having rollers 2 and 3 journaled for rotation thereon at the same level. The shafts of the rollers 2 and 3 are provided with gear wheels 4 and 5 respectively and a shaft 6 is journaled upon the frame 1 and is provided at its ends with gear wheels 7 which mesh with the gear wheels 4 and 5 of the rollers 2 and 3. Any suitable means may be provided for rotating the shaft 6. Brackets 8 are fixed to the frame 1 above the roller 2 and are provided with vertically disposed elongated sockets 9. The shaft of a weight roller 10 is journaled in the socket 9 and when a strip of cotton batting is not intervening between the rollers 2 and 10, the said roll 10 will rest at its lower portion upon the upper portion of the periphery of the roller 2.

Brackets 11 depend from the upper or end portion of the frame 1 and are provided upon their inner sides with approximately elliptical raceways 12. The raceways 12 are provided at their lower portions and at the bat receiving side of the apparatus with upwardly inclined sections 13 which merge into vertical sections 14 which in turn merge at their upper ends into the curved sections 15, the latter sections merging into the downwardly disposed section 16 which joins with the lower ends of the sections 13. The raceways 12 are provided at their inner portions with gear teeth 17 which extend from the upper portion only of the sections 14 along the lower sides of the sections 15 and down along the section 16. The inner sides of the sections 13 and the lower portions 14 are devoid of such gear teeth. A shaft 18 extends transversely across the frame 1 and is provided at its ends with pinions 19 which are arranged to move along the raceways 12 provided in the hangers 11. A roller 20 is carried by the shaft 18 and is located above the rollers 2 and 3 hereinbefore described. A shaft 21 is journaled at the top of the frame 1 and is provided in the vicinity of its ends with pinions 22. Rack bars 23 are pivoted at their lower ends to the shaft 18 and mesh with the pinions 22 carried by the shaft 21 and inasmuch as the rack bars 23 are located at the opposite ends of the shaft 18, the said shaft 18 is at all times maintained in parallel relation to the shaft 22 and in parallel relation to the axes of the rollers 2 and 3 irrespective of the vertical position of the roll 20 with relation to the said rollers 2 and 3.

Toggle links 24 are pivoted at their lower ends upon the shaft of the roller 3 and at their upper ends carry pins 25. Toggle links 26 are pivotally connected with the toggle links 24 at the pins 25 and the said toggle links 26 are pivoted at their upper ends upon the shaft 18. Gear wheels 27 are fixed to the shaft 18 and gear wheels 28 are journaled upon the pins 25 and mesh with the gear wheels 5 upon the shaft of the roller 3 and the gear wheels 27 upon the shaft 18. A press box 29 is located at the delivery end of the apparatus above described.

In operation the shaft 6 is rotated and through the gear wheel 7 rotary movement is transmitted to the wheels 4 and 5 and the rollers 2 and 3. From the wheel 5 motion is transmitted through the wheels 28 to the wheel 27 and the shaft 18. When the parts are in motion as indicated, cotton batting is fed to the apparatus below the roller 10 and above the roller 2. Inasmuch as the roller 2 is moving in a clockwise direction as indicated, the batting is carried under the roller 10 and is subjected to pressure of the weight thereof. As the compressed strip of batting passes from the upper portion of the roller 2 it passes upon the upper side portion of the roller 3 and is directed upwardly. When the end of the batting comes in contact with the lower portion of the roller 20 it is turned and curled upon itself in the form of a convolution as indicated in dotted lines in Fig. 1. As the roll of material between the rollers 2, 3 and 20 increases in diameter, the said roll of material will lift the roller 20 so that the shaft 18 is carried along the sections 13 and 14 of the raceways 12. During this movement the shaft 18 continues to rotate for the reason that the toggle links 24 and 26 will swing upon their pivotal connections and hold the gear wheels 28 in mesh with the gear wheels 5 and 27. When the gear wheels 19 arrive at the lower ends of the sets of gear teeth 17 in the raceway sections 14, the roll of material between the compression rollers 2, 3 and 20 has been completed and the said roll of material is then removed from between the rollers 2, 3 and 20 and delivered into the press box 29 preparatory to baling as indicated. As the shaft 18 then continues to rotate and just prior to the ejectment of the said roll of material, the gear teeth 19 engage the teeth 17 of the sets of gear teeth within the hangers 11 and the roller 20 is carried up so that the shaft 19 passes along the curved sections 15 of the said raceway 12 thence down along sections 16 of the said raceways to the lower ends of the raceways. The rolls are then in position to receive another strip of batting and the process of solidifying the batting in the form of rolls may be continued. When a sufficient number of rolls have been accumulated in the press or baling box 29 they are subjected to pressure and formed into a bale.

When the roller 20 is in its lowermost position, its axis or center is nearer to the axis or center of the roller 3 than it is to the axis or center of the roller 2. Consequently there is more space between the peripheries of the rollers 20 and 2 than there is between the rollers 20 and 3. This increased space between the rollers 20 and 2 provides ample room for the batting to enter between the rollers while the reduced space between the rollers 20 and 3 prevent the batting from passing between the last said rollers until the roll of material is completed and it is ejected as above described.

Having thus described the invention, what I claim as new and desire to secure by Letters Patent is:—

1. In an apparatus of the character described, a frame, brackets secured to the said frame having elliptical raceways therein and provided with gear teeth along one section thereof, a shaft having the extremities thereof arranged in the said raceways, pinions on the ends of the said shaft within the said raceways, a roller mounted on the said shaft, means for rotating the said shaft, means coöperating with the said roller for compressing the cotton batting, and means for constraining the ends of the said shaft to move in unison to and from the latter means.

2. An apparatus of the character described comprising a frame, a pair of rollers journaled therein, means for rotating the said rollers, gear wheels for one of the said rollers at the ends thereof, brackets at the upper portion of the frame having elliptical raceways therein and provided with gear teeth along one section thereof, a shaft having the extremities thereof arranged in the said raceways, pinions on the ends of the said shaft within the said raceways, a roller mounted on the said shaft, means for maintaining the said shaft parallel to the axes of the former rollers at all times, links pivoted together at their adjacent ends, one of the ends of the said links being pivoted to the said shaft and the other end of the said links being pivoted at the axis of the former roller having the gear wheels, gear wheels pivoted to the adjacent ends of the said links, said gear wheels meshing with the former gear wheels, and gear wheels on the shaft meshing with the latter gear wheels.

In testimony that I claim the foregoing as my own, I have hereto affixed my signature in the presence of two witnesses.

CHARLES BANISTER.

Witnesses:
 HYMAN W. LEMIRE,
 HARRY ROSENTHAL.